(12) United States Patent
Inoue

(10) Patent No.: US 9,137,413 B2
(45) Date of Patent: Sep. 15, 2015

(54) IMAGE READING DEVICE, IMAGE FORMING APPARATUS, AND IMAGE READING METHOD

(71) Applicant: KYOCERA Document Solutions Inc., Osaka (JP)

(72) Inventor: Takashi Inoue, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/534,485

(22) Filed: Nov. 6, 2014

(65) Prior Publication Data

US 2015/0124299 A1 May 7, 2015

(30) Foreign Application Priority Data

Jul. 11, 2013 (JP) ................................. 2013-231054

(51) Int. Cl.
*H04N 1/04* (2006.01)
*H04N 1/047* (2006.01)
*H04N 1/10* (2006.01)

(52) U.S. Cl.
CPC ............. *H04N 1/047* (2013.01); *H04N 1/1039* (2013.01)

(58) Field of Classification Search
CPC ............................. H04N 1/047; H04N 1/1039
USPC .................................. 358/497, 498, 474, 496
See application file for complete search history.

(56) References Cited

U.S. PATENT DOCUMENTS

2002/0075529 A1* 6/2002 Sato et al. ...................... 358/505
2008/0284858 A1* 11/2008 Sasaki et al. ............... 348/208.1

FOREIGN PATENT DOCUMENTS

JP H10-87107 A 4/1998

* cited by examiner

*Primary Examiner* — Houshang Safaipour
(74) *Attorney, Agent, or Firm* — Studebaker & Brackett PC

(57) ABSTRACT

An image reading device includes first carriage, a stepper motor, a shakiness level calculating section, and a timing adjusting section. The first carriage reads an image of a document to be read loaded on a document table. The stepper motor moves the first carriage relative to the document. The shakiness level calculating section calculates a shakiness level of the image, indicating shakiness of the image during reading by the first carriage, based on image data read by the first carriage with respect to a reference image incorporated into the document table. The timing adjusting section adjusts a rise timing of a step signal input to the stepper motor in accordance with the shakiness level that is calculated.

8 Claims, 5 Drawing Sheets

IMAGE READING DEVICE, IMAGE FORMING APPARATUS, AND IMAGE READING METHOD

INCORPORATION BY REFERENCE

The present application claims priority under 35 U.S.C. §119 to Japanese Patent Application No. 2013-231054, filed Nov. 7, 2013. The contents of this application are incorporated herein by reference in their entirety.

BACKGROUND

The present disclosure relates to an image reading device, an image forming apparatus, and an image reading method.

An image forming apparatus such as a photocopier or a multifunction peripheral includes an image reading device. The image reading device includes a reading section and a stepper motor. The reading section includes elements such as a light source, a reflecting mirror, an imaging lens, and a photoelectric converter. The light source shines light in a main scanning onto a document to be read that is loaded on a document table. The stepper motor moves the light source in a sub-scanning direction. Light reflected from the document is directed via the reflecting mirror and the imaging lens such as to be incident on the photoelectric converter. The photoelectric converter converts the light reflected from the document into electrical image data. A most common method for constant current control by a driver IC of the stepper motor is fixed OFF time control.

SUMMARY

A first aspect of the present disclosure is an image reading device including a reading section, a stepper motor, a shakiness level calculating section, and a timing adjusting section. The reading section reads an image of a document to be read that is loaded on a document table. The stepper motor moves the reading section relative to the document. The shakiness level calculating section calculates a shakiness level of the image, indicating shakiness of the image during reading by the reading section, based on image data read by the reading section with respect to a reference image incorporated into the document table. The timing adjusting section adjusts a rise timing of a step signal input to the stepper motor in accordance with the shakiness level that is calculated.

A second aspect of the present disclosure is an image forming apparatus including an image reading device and an image forming section that forms an image on a recording medium. The image reading device includes an image reading section, a stepper motor, a shakiness level calculating section, and a timing adjusting section. The reading section reads an image of a document to be read that is loaded on a document table. The stepper motor moves the reading section relative to the document. The shakiness level calculating section calculates a shakiness level of the image, indicating shakiness of the image during reading by the reading section, based on image data read by the reading section with respect to a reference image incorporated into the document table. The timing adjusting section adjusts a rise timing of a step signal input to the stepper motor in accordance with the shakiness level that is calculated.

A third aspect of the present disclosure is an image reading method including (1) to (3) described below. (1) Reading a reference image incorporated into a document table of an image reading device, performed by a reading section of the image reading device. (2) Calculating a shakiness level of an image of a document to be read that is loaded on the document table, indicating shakiness of the image during reading by the reading section, based on image data read by the reading section with respect to the reference image. (3) Adjusting, in accordance with the shakiness level that is calculated, a rise timing of a step signal input to a stepper motor of the image reading device that moves the reading section relative to the document.

DETAILED DESCRIPTION

Figure 1:
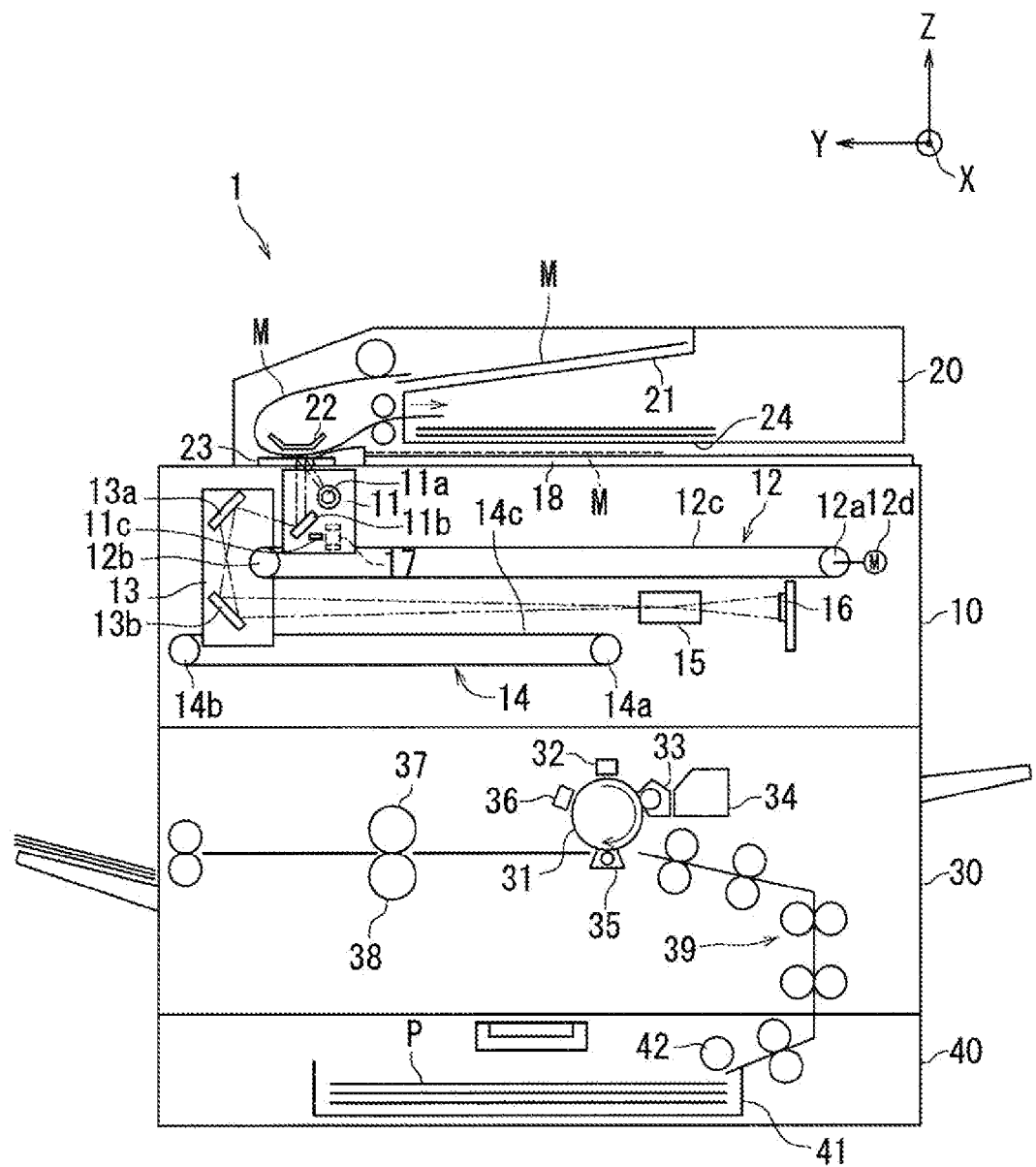
FIG. 1 is a schematic diagram illustrating configuration of an image forming apparatus according to an embodiment of the present disclosure.

The following explains an embodiment of the present disclosure with reference to the drawings. FIG. 1 is a schematic diagram illustrating configuration of an image forming apparatus according to the embodiment of the present disclosure.

An image forming apparatus 1 illustrated in FIG. 1 is a multifunction peripheral having functions such as a copy function, a print function, a facsimile function, and a scan function. The image forming apparatus 1 includes an image reading section 10 as an image reading device. The image forming apparatus 1 further includes an automatic document feeder (ADF) 20, an image forming section 30, and a sheet feed section 40.

The image reading section 10 includes a first carriage 11, a first transport mechanism 12, a second carriage 13, a second transport mechanism 14, an imaging lens 15, a charge-coupled device (CCD) 16, a photointerrupter 17, and a document table 18.

The first carriage 11 includes a light source 11a, a first reflecting mirror 11b, and shielding plate 11c.

The first transport mechanism 12 includes a pulley 12a, a pulley 12b, a first belt 12c, and a stepper motor 12d. The pulley 12a is attached to a body of the image reading section 10. The pulley 12b is attached to the second carriage 13. The pulley 12a and the pulley 12b are located such that there is an interval therebetween in a sub-scanning direction (i.e., a direction along the Y axis). The first belt 12c stretches between the pulley 12a and the pulley 12b, and is connected to the first carriage 11. The stepper motor 12d rotationally drives the pulley 12a, thereby causing, through the first belt 12c, the first carriage 11 to move in the sub-scanning direction and also causing the second carriage 13 to move in the sub-scanning direction.

The second carriage 13 includes a second reflecting mirror 13a and a third reflecting mirror 13b. The light source 11a shines white light onto a document M that is to be read. The first reflecting mirror 11b receives light reflected from the document M and changes the direction of the light such as to guide the light toward the second reflecting mirror 13a. The second reflecting mirror 13a receives the light reflected from the first reflecting mirror 11b and changes the direction of the light such as to guide the light toward the third reflecting mirror 13b. The third reflecting mirror 13b receives the light reflected from the second reflecting mirror 13a and changes the direction of the light such as to guide the light toward the imaging lens 15.

The second transport mechanism 14 includes a pulley 14a, a pulley 14b, and a second belt 14c. The pulley 14a and the pulley 14b are each attached to the body of the image reading section 10 and are located such that there is an interval therebetween in the sub-scanning direction. The second belt 14c stretches between the pulley 14a and the pulley 14b, and is connected to the second carriage 13.

The imaging lens 15 causes convergence of the light reflected from the third reflecting mirror 13b, thereby forming an image on the CCD 16. The CCD 16 converts the light reflected from the imaging lens 15 into an electrical signal.

The photointerrupter 17 is fixed to the body of the image reading section 10. The photointerrupter 17 includes a light emitter and a light receiver. The shielding plate 11c is located such as to pass between the light emitter and the light receiver of the photointerrupter 17. The shielding plate 11c passes between the light emitter and the light receiver of the photointerrupter 17 in accompaniment to movement of the first carriage 11.

The document table 18 is formed by a transparent glass plate and is located on an upper surface of the image reading section 10.

The first carriage 11, the light source 11a, the first reflecting mirror 11b, the shielding plate 11c, the first transport mechanism 12, the second carriage 13, the second reflecting mirror 13a, the third reflecting mirror 13b, the second transport mechanism 14, the imaging lens 15, the CCD 16, and the photointerrupter 17 collectively implement the functions of a reading section according to the present disclosure.

The ADF 20 is used during feed reading of a document M that is to be read. The ADF 20 includes a document tray 21, a document presser 22, ADF reading glass 23, and an ejection tray 24. Once the document M is loaded on the document tray 21, the document M is automatically conveyed, passing between the document presser 22 and the ADF reading glass 23, and is ejected onto the ejection tray 24. In the above situation, the first carriage 11 is held at a position below the ADF reading glass 23 and reads an image of the document M when the document M passes between the document presser 22 and the ADF reading glass 23.

The image forming section 30 forms an image on a sheet P, which is recording medium, by electrophotography based for example on image data read with respect to the document M by the image reading section 10 or image data input from an external device.

The image forming section 30 includes a photosensitive drum 31, a charger 32, a developer 33, a toner container 34, a transferer 35, a static eliminator 36, a fusing roller 37, a pressing roller 38, and a group of conveyance rollers 39.

The charger 32 charges an outer circumferential surface of the photosensitive drum 31 to a specific electric potential. Upon a laser emitter (not illustrated) irradiating the outer circumferential surface of the photosensitive drum 31 with laser light based on image data, an electrostatic latent image corresponding to the image data is formed on the outer circumferential surface of the photosensitive drum 31.

The developer 33 supplies a toner onto the outer circumferential surface of the photosensitive drum 31, thereby developing the electrostatic latent image into a toner image. The developer 33 receives a supply of the toner from the toner container 34. The transferer 35 transfers the toner image on the photosensitive drum 31 onto the sheet P. The static eliminator 36 subsequently eliminates electric potential on the outer circumferential surface of the photosensitive drum 31.

The fusing roller 37 and the pressing roller 38 melt the toner image by applying heat and pressure to the sheet P onto which the toner image has been transferred, and thereby fuse the toner image to the sheet P. The group of conveyance rollers 39 conveys the sheet P, which has been supplied from the sheet feed section 40, toward the photosensitive drum 31.

The sheet feed section 40 includes a sheet feed cassette 41 and a sheet feed roller 42. The sheet feed cassette 41 is freely attachable to and detachable from the sheet feed section 40, and stores therein a plurality of sheets P stacked in a pile. The sheet feed roller 42 picks up the sheets P in the sheet feed cassette 41 one at a time and feeds each of the sheets P to the group of conveyance rollers 39.

Figure 2:
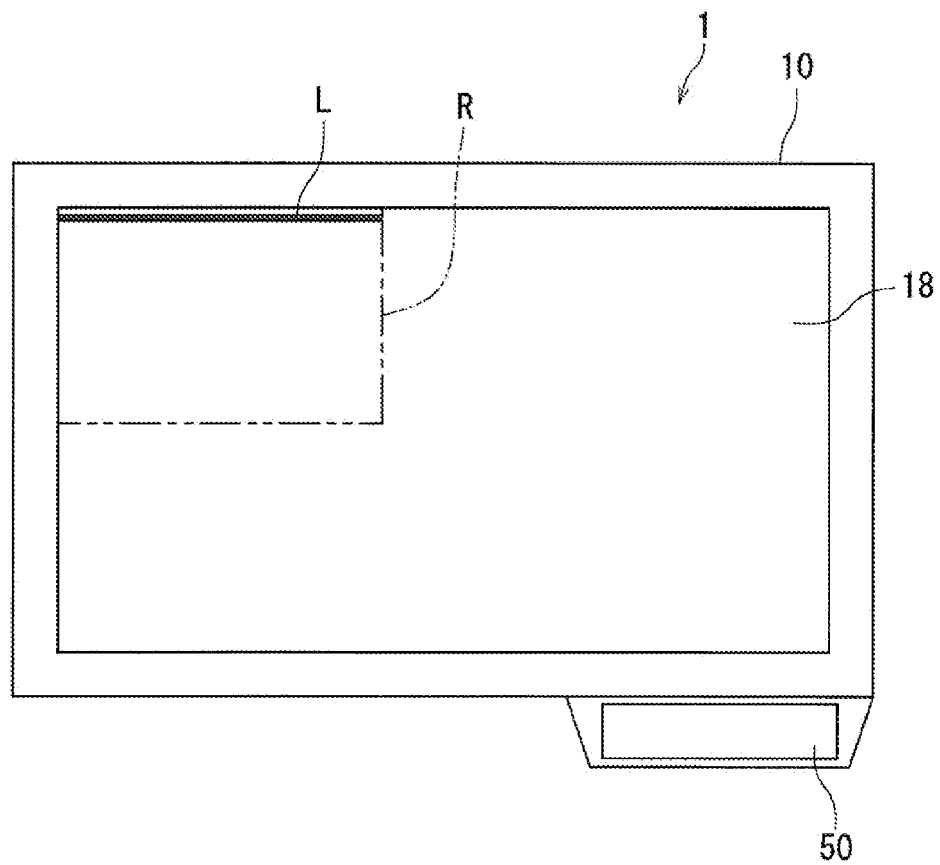
FIG. 2 is a top view of an image reading device included in the image forming apparatus in FIG. 1.
Figure 2:
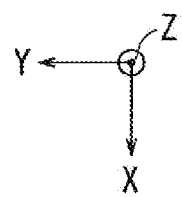

FIG. 2 is a top view of the image reading section 10. As illustrated in FIG. 2, the image forming apparatus 1 further includes an operating-displaying section 50. The operating-displaying section 50 is for example a liquid-crystal display, and includes a display and a group of touch panel operation buttons. Upon a user pressing a copy start button of the operating-displaying section 50 while a document M that is to be read is loaded on the document table 18, electrical image data is generated by the CCD 16 as a result of the first carriage 11 and the second carriage 13 moving in the sub-scanning direction and reading the document M.

The document table 18 is provided with a reference line L that is used as a reference image along one edge of a lower surface thereof. The reference line L extends in the sub-scanning direction and has a length of, for example, 200 mm. The reference line L is located within a readable range of the first carriage 11, but at a position such that the reference line L is not included in the image formed on the sheet P.

Figure 3:
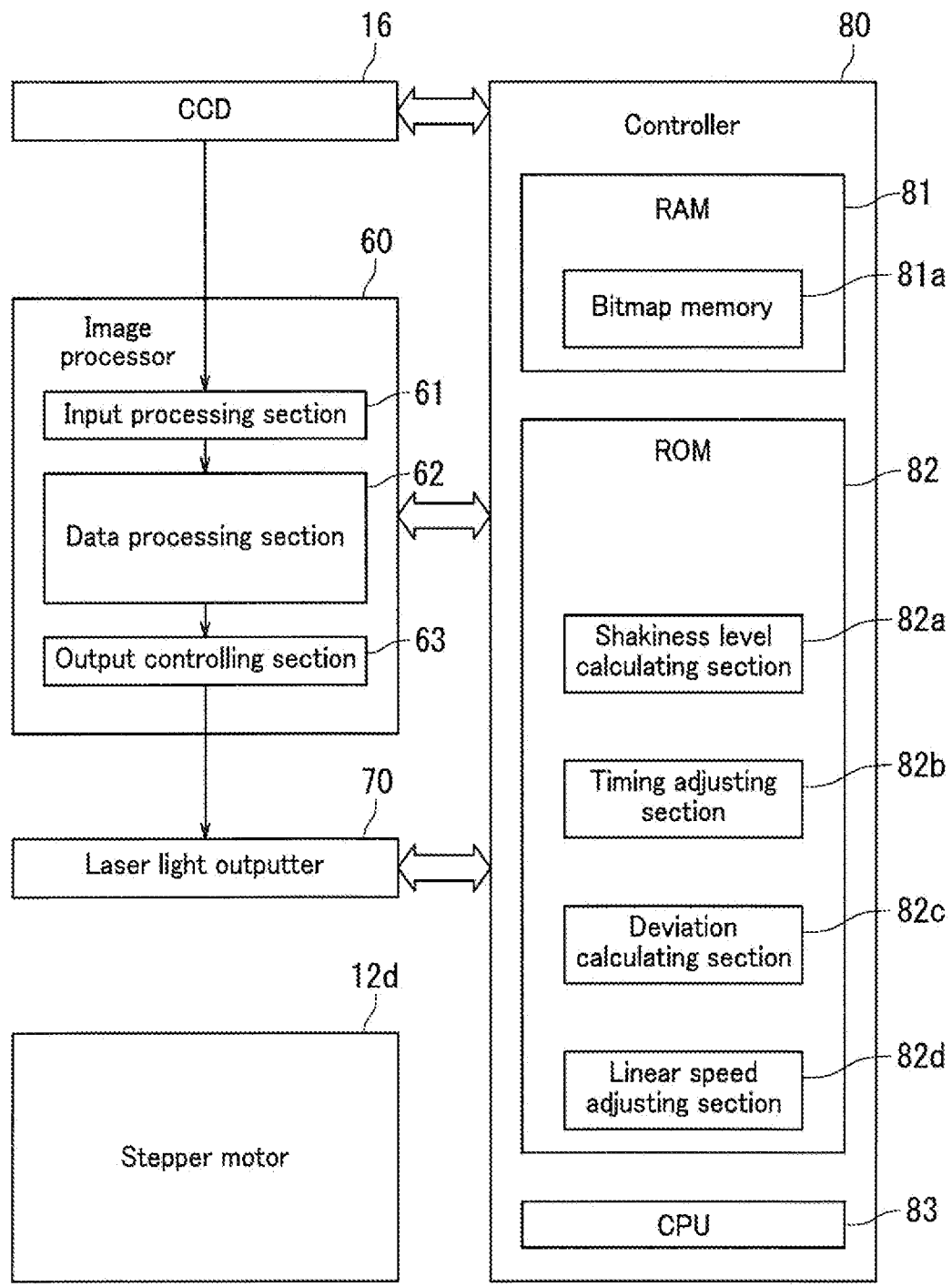
FIG. 3 is a block diagram illustrating a control system of the image reading device in FIG. 1.

FIG. 3 is a block diagram illustrating a control system of the image reading section 10. The image reading section 10 further includes an image processor 60, a laser light outputter 70, and a controller 80.

The image processor 60 is a microcomputer and includes an input processing section 61, a data processing section 62, and an output controlling section 63. The input processing section 61 receives the image data from the CCD 16 as input. The data processing section 62 performs image processing on the image data input to the input processing section 61. The output controlling section 63 outputs image data on which image processing has been performed by the data processing section 62 to the laser light outputter 70.

The laser light outputter 70 emits a laser beam based on the electrical image data output from the image processor 60.

The controller 80 is a microcomputer and includes RAM 81, ROM 82, and a CPU 83.

The RAM 81 includes a bitmap memory 81a. The bitmap memory 81a temporarily develops the image data input from the image processor 60 as bit information and counts a number of pixels of the image data.

The ROM 82 includes a shakiness level calculating section 82a, a timing adjusting section 82b, a deviation calculating section 82c, and a linear speed adjusting section 82d. The aforementioned sections are implemented by a program stored in the ROM 82.

The shakiness level calculating section 82a calculates a shakiness level of the image of the document M, indicating shakiness of the image that is caused during reading by the first carriage 11, based on image data read by the first carriage 11 with respect to the reference line L (refer to FIG. 2). More specifically, the shakiness level calculating section 82a generates a frequency spectrum by performing a Fourier transform on image data in the sub-scanning direction for the reference line L.

The timing adjusting section 82b adjusts a rise timing of a step signal input to the stepper motor 12d in accordance with the shakiness level that is calculated by the shakiness level calculating section 82a. The timing adjusting section 82b judges whether or not the frequency spectrum generated by the shakiness level calculating section 82a exceeds a preset threshold value in a characteristic vibration frequency range of the stepper motor 12d from 100 Hz to 200 Hz. The timing adjusting section 82b adjusts the rise timing of the step signal upon judging that the frequency spectrum exceeds the threshold value.

A stepper motor normally includes a device that outputs a clock of a specific frequency as a step signal. The frequency of the clock can be adjusted in order to control the speed of the stepper motor. The frequency can be adjusted by adjusting a multiplication/division ratio of an internal reference clock of the device. When the rise timing of the step signal is adjusted, a change in the speed of the stepper motor 12d may cause a deviation in proportionality of image dimensions.

The deviation calculating section 82c calculates an amount of deviation in proportionality of image dimensions. The reference line L for example has an actual length of 200 nm. The deviation calculating section 82c can calculate the amount of deviation in proportionality of image dimensions by calculating a length X of the reference line L that is read after adjustment of the step signal. The amount of deviation Y (%) in proportionality of image dimensions is for example calculated based on an expression: Y=X/(actual length of reference line L)×100.

The linear speed adjusting section 82d adjusts linear speed of reading in the sub-scanning direction by the first carriage 11 based on the amount of deviation Y calculated by the deviation calculating section 82c. More specifically, the linear speed adjusting section 82d sets a new value for linear speed of reading by multiplying linear speed of reading prior to adjustment by a factor of Y/100.

The CPU 83 controls the CCD 16, the image processor 60, the laser light outputter 70, and the stepper motor 12d based on a program stored in the ROM 82.

Figure 4:
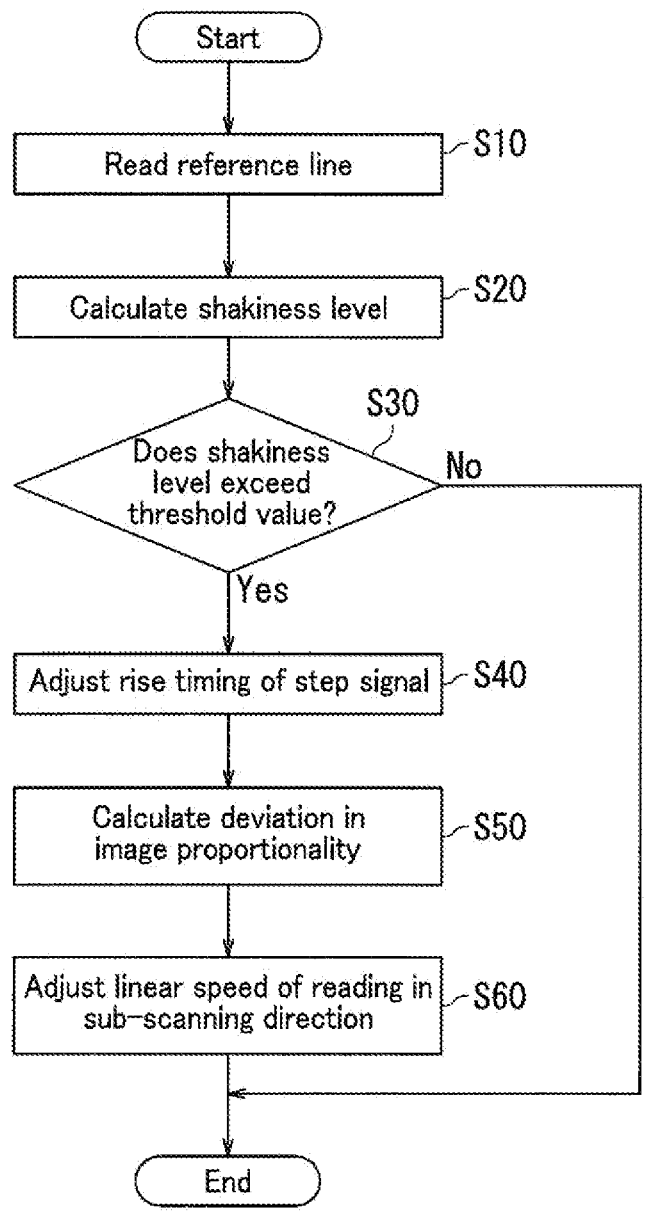
FIG. 4 is a flowchart illustrating an image reading method used by the image reading device in FIG. 1.
Figure 5:
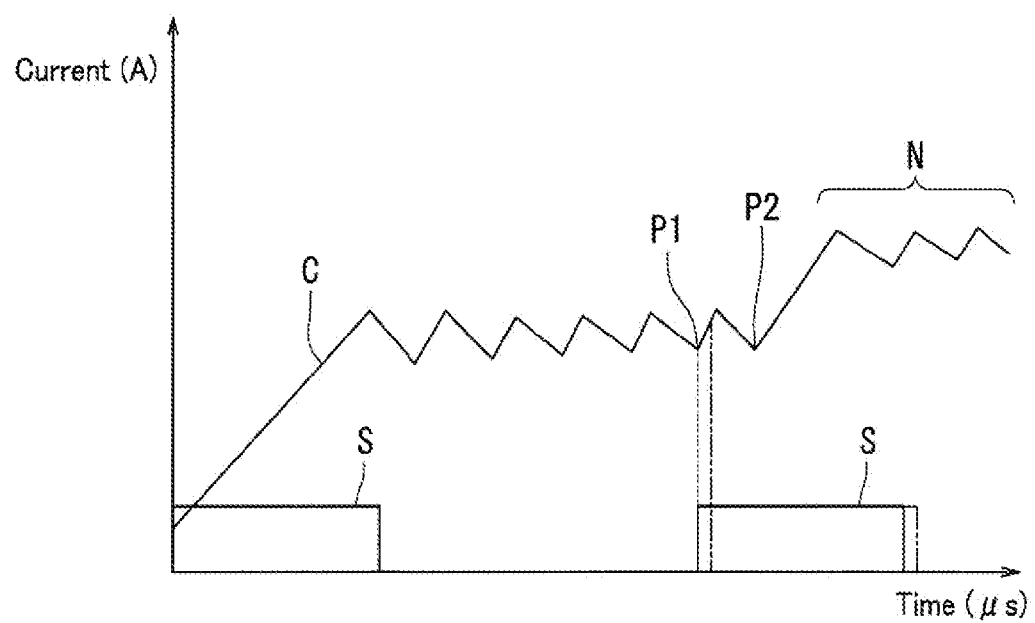
FIG. 5 is a graph illustrating a fixed OFF time control method of a stepper motor included in the image reading device in FIG. 1.

The following explains an image reading method used by the image reading section 10 with reference to FIGS. 4 and 5. FIG. 4 is a flowchart illustrating the image reading method used by the image reading section 10. FIG. 5 is a graph illustrating a fixed OFF time control method of the stepper motor 12d. In FIG. 5, the vertical axis represents current (A) and the horizontal axis represents time (μs).

As illustrated in FIG. 4, first the reference line L (refer to FIG. 2) is read in Step S10. More specifically, the stepper motor 12d is driven such that the first carriage 11 and the second carriage 13 move in the sub-scanning direction, thereby reading an image within a region R (refer to FIG. 2). The image which is read includes an image of the reference line L.

After conversion to electrical image data by the CCD 16, the image data is input to the image processor 60. The bitmap memory 81a of the controller 80 temporarily develops the image data input to the image processor 60 as bit information and counts a number of pixels included in the image of the reference line L. Step S10 is equivalent to a process of reading according to the present disclosure.

Next, the shakiness level calculating section 82a calculates a shakiness level in Step S20. More specifically, the shakiness level calculating section 82a generates a frequency spectrum by performing a Fourier transform on the image of the reference line L. Step S20 is equivalent to a process of calculating a shakiness level according to the present disclosure.

Next, in Step S30, the timing adjusting section 82b judges whether or not the frequency spectrum that is generated exceeds a preset threshold value in a characteristic vibration frequency range (100 Hz to 200 Hz) of the stepper motor 12d.

Upon the timing adjusting section 82b judging that the frequency spectrum (shakiness level) exceeds the threshold value in Step S30 (Step S30: Yes), in Step S40 the timing adjusting section 82b adjusts a rise timing of a step signal input to the stepper motor 12d. For example, the timing adjusting section 82b delays the rise timing of the step signal input to the stepper motor 12d by a specific amount of time. Step S40 is equivalent to a process of adjusting a rise timing according to the present disclosure.

In FIG. 5 for example, a rise timing of a step signal S, which is represented by a solid line, approximately coincides with a timing P1 at which current C transitions to a fixed OFF period. As a consequence, there is a possibility that two different states may occur, one in which the current C transitions to a next phase N at a timing P2 and another in which the current C transitions to the next phase N at the timing P1. In such a situation, the stepper motor 12d may vibrate and thus may cause shakiness of an image.

In consideration of the above issue, the probability that the current C transitions to the next phase N at the timing P2 can be increased by, for example, delaying the rise timing of the step signal S as indicated by the dashed and double dotted line in FIG. 5. Through the above, vibration of the stepper motor 12d can be suppressed. As a result, shakiness of the image can be restricted, thereby suppressing image defects.

Suppressing vibration of the stepper motor 12d enables the image reading section 10 to perform stable scanning of the document M, thereby improving image quality of the image that is formed on the sheet P. Furthermore, suppressing vibration of the stepper motor 12d also reduces noise produced by the stepper motor 12d.

Adjustment of the rise timing of the step signal S results in a change in speed of the stepper motor 12d, which may cause a deviation in proportionality of image dimensions. In consideration of the above, in the present embodiment the deviation calculating section 82c calculates an amount of deviation in proportionality of image dimensions in Step S50 shown in FIG. 4. Step S50 is equivalent to a process of calculating an amount of deviation according to the present disclosure.

Next, in Step S60, the linear speed adjusting section 82d adjusts a linear speed of reading in the sub-scanning direction by the first carriage 11 based on the amount of deviation in proportionality of image dimensions that is calculated by the deviation calculating section 82c. As a result of the above, the amount of deviation in proportionality of image dimensions can be reduced and consequently image defects can be suppressed. Step S60 is equivalent to a process of adjusting a linear speed of reading according to the present disclosure.

Note that when the shakiness level does not exceed the threshold value in Step S30 (Step S30: No), the image reading method is complete without performing Steps S40 to S60.

A specific embodiment of the present disclosure is described above with reference to FIGS. 1 to 5. However, the present disclosure is of course not limited to the embodiment and a wide range of variations may be implemented with respect to the embodiment.

For example, the process of calculating the amount of deviation in proportionality of image dimensions and the process of adjusting the linear speed of reading in the sub-scanning direction in accordance with the amount of deviation are performed after adjusting the rise timing of the step signal in the present embodiment. However, the process of calculating the amount of deviation and the process of adjusting the linear speed of reading may alternatively be omitted.

Also, the timing adjusting section 82b adjusts the rise timing of the stepper motor 12d when the shakiness level exceeds the threshold value in the present embodiment, but alternatively the timing adjusting section 82b may adjust the rise timing of the stepper motor 12d without a threshold value being set.

The reference image is a line in the present embodiment, but the reference image is not limited to being a line and may have a different shape such as a rectangular shape.

Photoelectric conversion of image data is performed by a CCD in the present embodiment, but photoelectric conversion of image data is not limited to being performed by the CCD. Photoelectric conversion of image data may alternatively be performed by a photoelectric converter other than a CCD, such as an image sensor.

The image forming apparatus is a multifunction peripheral in the present embodiment, but the image forming apparatus is not limited to being a multifunction peripheral and may alternatively be a different type of image forming apparatus such as an apparatus that only has a photocopying function.

The image forming apparatus includes an image forming section of an electrophotographic type in the present embodiment, but the image forming section is not limited to being of an electrophotographic type. The image forming apparatus may alternatively include a different type of image forming section, such as an image forming section of an inkjet type.

In addition to the variations described above, a wide range of other variations can be implemented with respect to the present embodiment, so long as such variations do not deviate from the intended scope of the present disclosure.

What is claimed is:

1. An image reading device comprising:
   a reading section configured to read an image of a document to be read that is loaded on a document table;
   a stepper motor configured to move the reading section relative to the document;
   a shakiness level calculating section configured to calculate a shakiness level of the image, indicating shakiness of the image during reading by the reading section, based on image data read by the reading section with respect to a reference image incorporated into the document table; and
   a timing adjusting section configured to adjust a rise timing of a step signal input to the stepper motor in accordance with the shakiness level that is calculated.

2. An image reading device according to claim 1, further comprising:
   a deviation calculating section configured to calculate an amount of deviation in proportionality of image dimensions resulting from adjustment of the rise timing; and
   a linear speed adjusting section configured to adjust a linear speed of reading by the reading section in a movement direction thereof based on the amount of deviation that is calculated.

3. An image reading device according to claim 1, wherein the reading section reads the image of the document in a main scanning direction, and
   the stepper motor moves the reading section in a sub-scanning direction.

4. An image reading device according to claim 3, wherein the reference image extends in the sub-scanning direction.

5. An image reading device according to claim 1, wherein the timing adjusting section adjusts the rise timing when the shakiness level that is calculated exceeds a threshold value.

6. An image forming apparatus comprising:
   an image reading device according to claim 1; and
   an image forming section configured to form an image on a recording medium.

7. An image reading method comprising:
   reading a reference image incorporated into a document table of an image reading device, performed by a reading section of the image reading device;
   calculating a shakiness level of an image of a document to be read that is loaded on the document table, indicating shakiness of the image during reading by the reading section, based on image data read by the reading section with respect to the reference image; and
   adjusting, in accordance with the shakiness level that is calculated, a rise timing of a step signal input to a stepper motor of the image reading device that is configured to move the reading section relative to the document.

8. An image reading method according to claim 7, further comprising
   calculating an amount of deviation in proportionality of image dimensions resulting from adjustment of the rise timing; and
   adjusting a linear speed of reading by the reading section in a movement direction thereof based on the amount of deviation that is calculated.

* * * * *